(12) United States Patent
Park et al.

(10) Patent No.: US 10,747,360 B2
(45) Date of Patent: Aug. 18, 2020

(54) DISPLAY DEVICE AND DRIVER THEREOF

(71) Applicant: SILICON WORKS CO., LTD., Daejeon-si (KR)

(72) Inventors: Jong Min Park, Daejeon (KR); Hun Yong Lim, Daejeon (KR); Hyun Woo Jeong, Daejeon (KR); Young Uk Chang, Daejeon (KR); Chung Min Lee, Daejeon (KR); Ha Na Choi, Daejeon (KR)

(73) Assignee: Silicon Works Co., Ltd., Daejeon-si (KR)

( * ) Notice: Subject to any disclaimer, the term of this patent is extended or adjusted under 35 U.S.C. 154(b) by 0 days.

(21) Appl. No.: 16/403,413

(22) Filed: May 3, 2019

(65) Prior Publication Data
US 2019/0339808 A1     Nov. 7, 2019

(30) Foreign Application Priority Data

May 3, 2018   (KR) .................. 10-2018-0051178
May 2, 2019   (KR) .................. 10-2019-0051472

(51) Int. Cl.
  *G06F 3/041*      (2006.01)
(52) U.S. Cl.
  CPC .......... *G06F 3/0416* (2013.01); *G06F 3/0412* (2013.01)
(58) Field of Classification Search
  CPC .... G06F 3/0416; G06F 3/04184; G06F 3/044; G09G 3/2096; G09G 2370/08; G09G 2310/08; G09G 2370/10; G09G 2370/04; G09G 3/3275; G09G 3/3685; G09G 3/3688; G09G 3/3692; G09G 2310/0294; G09G 3/0412
  See application file for complete search history.

(56) References Cited

U.S. PATENT DOCUMENTS

2015/0346887 A1*  12/2015  Cho ..................... G09G 3/3696
                                                                345/174
2016/0125840 A1*  5/2016  Oh ......................... G09G 5/008
                                                                345/213

FOREIGN PATENT DOCUMENTS

| KR | 10-2015-0138922 | 12/2015 |
| KR | 10-2015-0139473 | 12/2015 |
| KR | 10-2018-0003742 | 1/2018 |
| KR | 10-2018-0003743 | 1/2018 |

\* cited by examiner

*Primary Examiner* — Dennis P Joseph
(74) *Attorney, Agent, or Firm* — Polsinelli PC (57) ABSTRACT

The present disclosure discloses a display device that performs a read operation corresponding to a touch based on a multipoint interface (MPI) protocol. In the display device, a microcontroller and a plurality of drivers share MPI buses and perform the read operation for a touch, and turning on of reception buffers may be efficiently controlled by providing a wake-up signal by a selected driver designated by a read command of the microcontroller to unselected drivers at the time of completion of transmission of touch data.

20 Claims, 7 Drawing Sheets

DISPLAY DEVICE AND DRIVER THEREOF

CROSS-REFERENCE TO RELATED APPLICATION

This application claims priority to and the benefit of Korean Patent Application Nos. 10-2018-0051178 and 10-2019-0051472, filed on May 3, 2018 and May 2, 2019, respectively, the disclosures of which are incorporated herein by reference in its entirety.

BACKGROUND

1. Field of the Invention

The present disclosure relates to a display device, and more particularly, to a display device configured to perform a read operation, for a touch, between a microcontroller and a driver, and the driver thereof.

2. Discussion of Related Art

Display devices such as liquid crystal displays (LCDs) or organic light-emitting diodes (OLEDs) are being developed such that touch-based input processing is enabled. Display devices capable of touch-based input processing may be defined as touch display devices.

The touch display devices are being applied to various electronic devices such as portable terminals such as smartphones, laptop computers, monitors, and home appliances.

The touch display device typically includes a plurality of drivers, a timing controller, and a microcontroller.

The timing controller is configured to provide display data for displaying images to the plurality of drivers.

The plurality of drivers provide source signals corresponding to the display data to a display panel in a display period. Further, the plurality of drivers readout touch signals sensed by touch sensors of the display panel in the touch period, and output touch data for the read-out touch signals to the microcontroller.

The microcontroller requests transmission of the touch data to the plurality of drivers in the touch period, receives the touch data according to the request, and performs digital logic such as calculating touch coordinates using the touch data.

As an example, data communication between the plurality of drivers and the timing controller may be implemented using an embedded clock point-to-point interface (EPI) protocol. Further, data communication between the plurality of drivers and the microcontroller may be implemented using a multipoint interface (MPI) protocol.

In conventional touch display devices, the data communication between the plurality of drivers and the microcontroller has been configured using a serial peripheral interface (SPI) protocol. The SPI protocol is configured to transmit data in a point-to-point manner. In the SPI protocol, the driver is configured to output the touch data to the microcontroller in synchronization with a system clock SCLK, which is an output clock of the microcontroller.

Recently, in order to solve the vulnerability of the SPI protocol-based communication, touch display devices are being developed to use the above-described MPI protocol for the data communication between the plurality of drivers and the microcontroller.

The MPI protocol is configured to transmit data in a multipoint bus structure, and one microcontroller and a plurality of drivers are configured to share a bus (an MPI bus) by the MPI protocol. In the case of the MPI protocol, the driver is configured to output touch data to the microcontroller using its own transmission clock ECLK to prevent data skew.

In the MPI protocol, the microcontroller and the plurality of drivers share the MPI bus and are configured to perform a read operation for a touch. The read operation may be classified into a read request in which the microcontroller requests touch data to the driver and a read data operation in which the driver transmits the touch data to the microcontroller.

When the read operation is performed, the plurality of drivers are classified into a selected driver for which the read request is designated and an unselected driver for which the read request is not designated. The selected driver and the unselected driver need to be efficiently controlled for the read operation.

Specifically, each of the drivers always monitors the MPI bus shared with the microcontroller and the plurality of other drivers using the transmission clock ECLK for the read operation. Accordingly, reception buffers of each driver always remain "turned on" to monitor the shared MPI bus. The unselected driver has to monitor the transmission clock ECLK of the selected driver to control status.

As described above, in the MPI protocol, the reception buffers of each driver always have to remain "turned on" for the read operation, and accordingly, there is a problem in that a large amount of current is consumed.

In addition, the reception buffers of the plurality of unselected drivers are in a turned-on state while the selected driver transmits the touch data to the microcontroller. Thus, an eye diagram of each unselected driver is deteriorated due to an influence of the touch data transmitted through the shared MPI bus, and as a result, the unselected driver may be brought into an abnormal status.

The driver in the abnormal status needs to be reset. However, in the abnormal state, it is difficult to reset the driver automatically.

Further, the plurality of drivers monitor the transmission clock ECLK of the shared MPI bus to control the status. Thus, it is difficult for the plurality of drivers to recognize a start and an end of a command for the read request at the same time point. Further, when the selected driver transmits the touch data through the shared MPI bus, it is difficult for the plurality of unselected drivers to accurately recognize a time point at which the selected driver completes the transmission of the touch data.

For the above-described reasons, the time point for controlling the reception buffers may vary between the plurality of drivers, thereby possibly causing a communication failure.

SUMMARY OF THE INVENTION

The present disclosure is directed to providing a display device and a driver thereof capable of reducing current consumption due to turning on reception buffers and preventing status of unselected drivers from being deteriorated due to an influence of touch data transmitted through a shared MPI bus, when a microcontroller and a plurality of drivers share the bus and perform a read operation for a touch.

Also, the present disclosure is directed to providing a display device and a driver thereof capable of improving a time point at which buffers are controlled and preventing a communication failure between a plurality of drivers by allowing the plurality of drivers to recognize a start and an end of a command for a read request at the same time in a read operation.

Also, the present disclosure is directed to providing a display device and a driver thereof capable of improving a time point at which buffers of a plurality of drivers are controlled and preventing a communication failure between the plurality of drivers by notifying unselected drivers of a time point at which a selected driver completes transmission of touch data using a signal line for transmitting a lock signal.

According to an aspect of the present disclosure, there is provided a display device including a controller configured to transmit a read command for a read request through a bus in a first period and receive touch data through the bus in a second period; and a first driver and a second driver configured to be connected to the bus, wherein the first driver, as selected by the read command, transmits the touch data through the bus by the read command in the second period, the first driver generates a wake-up signal corresponding to an end of the transmission of the touch data, and transmits the wake-up signal to the second driver, reception buffers of the first driver and the second driver are turned on during the first period and turned off during the second period, and turn-on time points of the reception buffers are synchronized with the wake-up signal.

According to another aspect of the present disclosure, there is provided a driver of a display device, the driver including: a reception buffer coupled to an external bus, and configured to be turned on in a first period for a read request during a read operation and to be turned off in a second period for a read data operation following a read command; a transmission buffer coupled to the bus, and configured to be turned off in the first period, and to be turned on in the second period to transmit touch data when the driver is selected by the read command received; a data processor configured to receive the read command through the reception buffer, provide the touch data to the transmission buffer in the second period when the driver is designated by the read command, and generate a wake-up signal corresponding to the end of the transmission of the touch data; a transmission circuit configured to receive the wake-up signal of an external signal line or the data processor, transmit the wake-up signal of the signal line to the signal line in a first case in which the driver is not selected by the read command, and transmit the wake-up signal of the data processor to the signal line in a second case in which the driver is selected by the read command; and a buffer controller configured to control turning on and off of the reception buffer and the transmission buffer in response to operation control signals having different voltage levels in the first period and the second period and received through an external control line, and to control such that a turn-on time point of the reception buffer is synchronized with the wake-up signal of the signal line or the data processor.

BRIEF DESCRIPTION OF THE DRAWINGS

The above and other objects, features, and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present disclosure will be described in detail with reference to the accompanying drawings. Terms used in the present specification and claims should not be construed as being limited to ordinary or dictionary meanings and should be construed as meanings and concepts corresponding to technical aspects of the present disclosure.

Since the embodiments described in the present specification and configurations illustrated in drawings are only exemplary embodiments and do not represent the overall technological scope of the present disclosure, various equivalents and modifications may have been present at a filing time of the present application.

Figure 1:
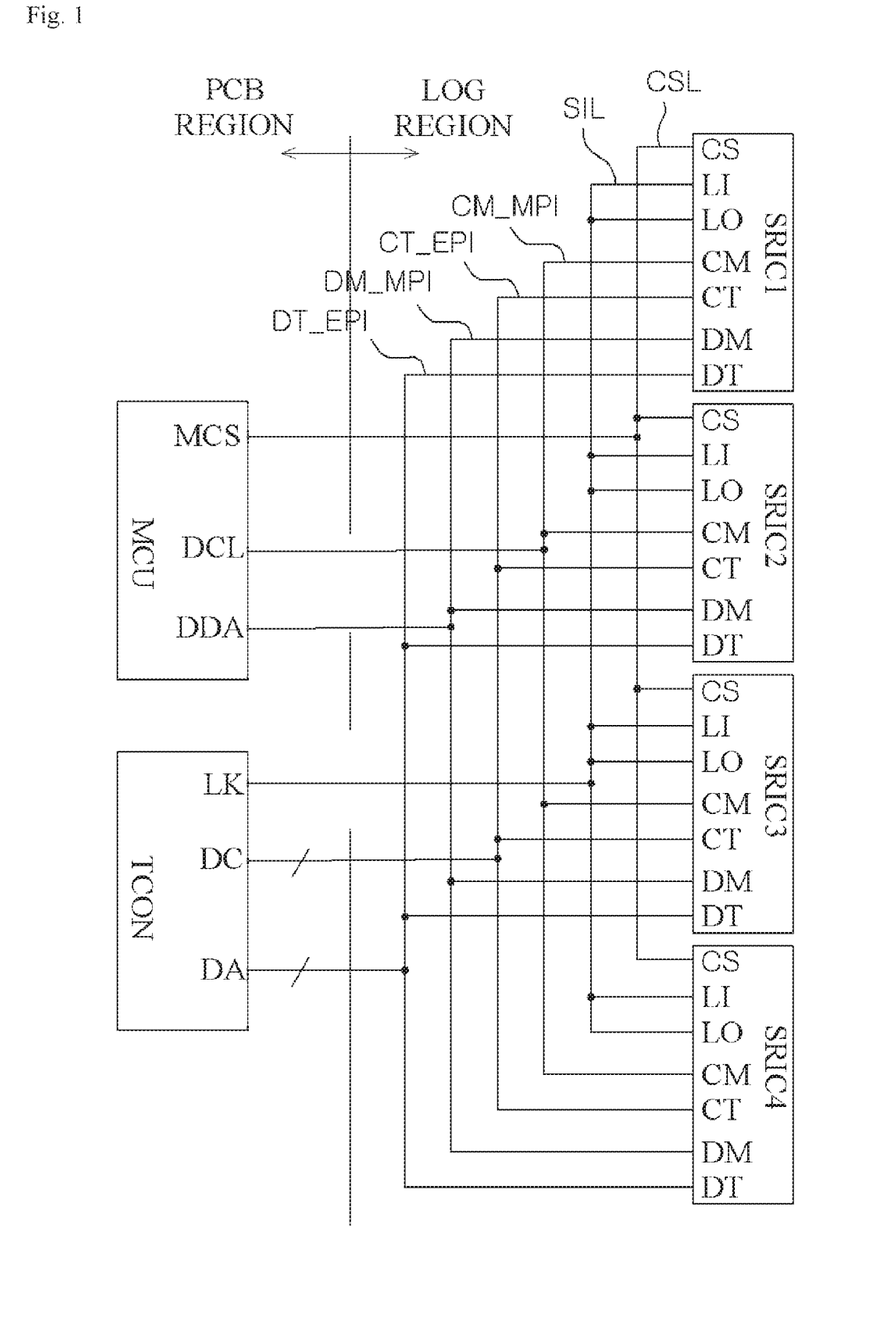
FIG. 1 is a block diagram illustrating a display device according to an embodiment of the present disclosure.

FIG. 1 is a block diagram exemplifying a display device according to an embodiment of the present disclosure.

In FIG. 1, a PCB region may be understood as a printed circuit board, a LOG region may be understood as a glass of a display panel, and parts are mounted in each of the PCB region and the LOG region.

The display device includes a timing controller TCON, a microcontroller MCU, and a plurality of drivers SRIC1 to SRIC4. In FIG. 1, an example is illustrated in which the timing controller TCON and the microcontroller MCU are mounted on the PCB region, and the plurality of drivers SRIC1 to SRIC4 are mounted on the LOG region.

The embodiment of the display device of the present disclosure is for driving a display panel (not shown), and the display panel includes pixels for displaying and touch sensors for touch sensing. As an example, the pixels may be configured in a display region of the display panel, and the touch sensors may be configured in the display region in an in-cell manner in which some electrodes of the pixels are shared.

The display panel drives the pixels to display images in a display period and drives the touch sensors to output touch signals which sense a touch in a touch period. The display period and the touch period may be repeated periodically. The timing controller TCON and the microcontroller MCU control a display operation in the display period and a touch sensing operation in the touch period in the plurality of drivers SRIC1 to SRIC4 by sharing a touch period control signal Tsync, for distinguishing the display period and the touch period from each other.

In FIG. 1, the embodiment is configured to perform data communication between the timing controller TCON and the plurality of drivers SRIC1 to SRIC4 based on an embedded clock point-to-point interface (EPI) protocol.

More specifically, the timing controller TCON and the plurality of drivers SRIC1 to SRIC4 are connected to each other through EPI buses for EPI protocol-based communication.

As an example, the timing controller TCON is connected to each of the drivers SRIC1 to SRIC4 on a one-to-one basis through different EPI buses. Here, the EPI bus may be exemplified as including a data transmission line DT_EPI and a clock transmission line CT_EPI. In addition, transmission data of the timing controller TCON may have a format in which a clock is embedded in data (images and control data).

Further, in FIG. 1, the embodiment is configured to perform data communication between the microcontroller MCU and the plurality of drivers SRIC1 to SRIC4 based on a multipoint interface (MPI) protocol.

More specifically, the microcontroller MCU and the plurality of drivers SRIC1 to SRIC4 are connected to each other through MPI buses for MPI protocol-based communication.

As an example, the microcontroller MCU is connected to all the drivers SRIC1 to SRIC4 through MPI buses DM_MPI and CM_MPI. That is, the microcontroller MCU and the plurality of drivers SRIC1 to SRIC4 share the MPI buses DM_MPI and CM_MPI with each other. Here, the MPI buses may be exemplified as including a data transmission bus DM_MPI and a clock transmission bus CM_MPI. In the description of the embodiment of the present disclosure, the data transmission bus and the clock transmission bus are collectively referred to as the "MPI bus".

Although not specifically shown in the drawing, the timing controller TCON may be configured to provide the touch period control signal Tsync to the microcontroller MCU and the plurality of drivers SRIC1 to SRIC4. The touch period control signal Tsync may be provided so as to have a logical low (L) level corresponding to the touch period and have a logical high (H) level corresponding to the display period.

Further, the timing controller TCON includes a plurality of data terminals and a plurality of clock terminals each corresponding to the plurality of drivers SRIC1 to SRIC4. For the convenience of description, the plurality of data terminals are expressed as one data terminal DA, and the plurality of clock terminals are expressed as one clock terminal DC in the embodiment of FIG. 1. The data terminal DA and the clock terminal DC of the timing controller TCON are connected to a data terminal DT and a clock terminal CT of each of the drivers SRIC1 to SRIC4 on a one-to-one basis through the EPI buses.

Further, the timing controller TCON includes a lock signal terminal LK connected to a signal line SIL. The timing controller TCON is configured to receive a lock signal transmitted from the plurality of drivers SRIC1 to SRIC4 through the signal line SIL provided separately from the EPI buses DT_EPI and CT_EPI.

The microcontroller MCU includes a data terminal DDA, a clock terminal DCL, and a chip selection terminal MCS. The data terminal DDA and the clock terminal DCL share the MPI buses DM_MPI and CM_MPI to communicate with the plurality of drivers SRIC1 to SRIC4.

The microcontroller MCU outputs a DDA signal S_DDA, which is a data signal, to the plurality of drivers SRIC1 to SRIC4 through the data terminal DDA and the MPI bus DM_MPI connected to the data terminal DDA. The microcontroller MCU outputs a DCL signal S_DCL, which is a clock signal, to the plurality of drivers SRIC1 to SRIC4 through the clock terminal DCL and the MPI bus CM_MPI connected the clock terminal DCL.

Further, the microcontroller MCU shares an operation control signal CSN with the plurality of drivers SRIC1 to SRIC4 through a separate control line CSL connected to the chip selection terminal MCS.

The microcontroller MCU may designate a specific driver among the plurality of drivers SRIC1 to SRIC4 by a read operation to request transmission of touch data, and receive the touch data transmitted by the designated driver in response to the request. In addition, the microcontroller MCU may perform digital logic such as calculating touch coordinates using the touch data.

Each of the plurality of drivers SRIC1 to SRIC4 includes: the data terminal DT and the clock terminal CT corresponding to the timing controller TCON; a data terminal DM, a clock terminal CM, and a chip selection terminal CS corresponding to the microcontroller MCU; and a lock signal input terminal LI and a lock signal output terminal LO for inputting and outputting the lock signal.

The plurality of drivers SRIC1 to SRIC4 receive transmission signals from the timing controller TCON through the data terminal DT and the clock terminal CT, restore the transmission signals into display data and the clock signal, generate source signals using the restored display data and clock signal, and provide the source signals to the display panel.

The plurality of drivers SRIC1 to SRIC4 are configured to periodically perform clock training to maintain the clock signal stably.

When the clock signal is stable, the plurality of drivers SRIC1 to SRIC4 use the clock signal by locking a phase of the clock signal, generate a lock signal LOCK corresponding to the locking of the clock signal, and output the lock signal LOCK to the signal line SIL.

Alternatively, when the clock signal is unstable due to internal or external factors, the plurality of drivers SRIC1 to SRIC4 generate a lock signal LOCK corresponding to a lock failure and transmit the lock signal LOCK to the timing controller TCON through the signal line SIL. As an example, the lock signal LOCK may be generated as a logical high (H) in a case in which the clock signal is stable, and may be generated as a logical low (L) in a case in which the lock failure occurs.

Each of the plurality of drivers SRIC1 to SRIC4 is configured to combine a lock signal LOCK_INT generated internally with the lock signal LOCK of the other drivers received through the lock signal input terminal LI and output the combined result as the lock signal LOCK to the other drivers or the timing controller TCON through the lock signal output terminal LO.

The embodiment of the present disclosure may be configured such that the plurality of drivers SRIC1 to SRIC4 combine the lock signals while sequentially transmitting the lock signal LOCK through the signal line SIL.

The embodiment of the present disclosure may be configured such that a pull-up voltage of a constant voltage is applied to the signal line SIL for transmitting the above-described lock signal LOCK and a wake-up signal WU to be described below.

More specifically, the first-order driver is configured to combine the constant voltage applied to the lock signal input terminal LI through the signal line SIL and the internal lock signal LOCK_INT according to a state of the internal clock signal, and output the combined result as the lock signal LOCK to the signal line SIL through the lock signal output terminal LO.

In addition, the remaining-order drivers are configured to sequentially combine the lock signal LOCK of the lock signal input terminal LI and the internal lock signal LOCK_INT, and output the combined result as the lock signal LOCK to the signal line SIL through the lock signal output terminal LO.

In addition, the last-order driver is configured to combine the lock signal LOCK of the lock signal input terminal LI and the internal lock signal LOCK_INT, and output the combined result as the lock signal LOCK to the timing controller TCON through the lock signal output terminal LO and the signal line SIL.

As described above, the timing controller TCON and the plurality of drivers SRIC1 to SRIC4 are configured to share the lock signal LOCK through the signal line SIL.

Meanwhile, the plurality of drivers SRIC1 to SRIC4 communicate with the microcontroller MCU through the data terminal DM, which is connected to the MPI buses DM_MPI and CM_MPI, and the clock terminal CM.

The read operation includes a read request and a read data operation.

The microcontroller MCU transmits a read command for the read request to the data terminal DM and the clock terminal CM of each of the plurality of drivers SRIC1 to SRIC4 through the MPI buses DM_MPI and CM_MPI.

The read command includes information of the driver to which the read data operation is to be designated.

Thus, the selected driver designated by the read command performs the read data operation in response to the read request. Specifically, the selected driver transmits the touch data to the microcontroller MCU through the MPI buses DM_MPI and CM_MPI shared with the data terminal DM and the clock terminal CM. Further, unselected drivers not designated by the read command do not perform the read data operation.

Each of the plurality of drivers SRIC1 to SRIC4 includes reception buffers 50 and 52 (in FIG. 2) for receiving data through the MPI buses DM_MPI and CM_MPI, and transmission buffers 60 and 62 (in FIG. 2) for transmitting the touch data through the MPI buses DM_MPI and CM_MPI.

The microcontroller MCU may perform the read request by designating one driver in which the read operation is performed.

The plurality of drivers SRIC1 to SRIC4 receive the read request in a state in which the reception buffers 50 and 52 are turned on. The plurality of drivers SRIC1 to SRIC4 turn off the reception buffers 50 and 52 when the reception of the read request is ended.

The selected driver among the plurality of drivers SRIC1 to SRIC4 performs the read data operation. That is, the selected driver turns on the transmission buffers 60 and 62 for the read data operation and then transmits the touch data in response to the read request through the transmission buffers 60 and 62.

When the transmission of the touch data is completed, the selected driver generates the wake-up signal WU and transmits the wake-up signal WU to the plurality of unselected drivers and then turns off the transmission buffers 60 and 62.

After the selected driver has transmitted the touch data, turn-on time points of the reception buffers 50 and 52 of the selected driver and the unselected drivers, that is, the plurality of drivers SRIC1 to SRIC4, are synchronized to the wake-up signal WU. As a result, the reception buffers 50 and 52 of the plurality of drivers SRIC1 to SRIC4 are simultaneously turned on.

The embodiment of the present disclosure is configured to share the wake-up signal WU between the plurality of drivers SRIC1 to SRIC4 using the signal line SIL which shares the lock signal.

As described with reference to FIG. 1, the embodiment of FIG. 1 is configured to include the microcontroller MCU and the plurality of drivers SRIC1 to SRIC4.

The read operation includes the read request and the read data operation. The selected driver in which the read data operation is performed is changed every read operation cycle. Accordingly, the read data operation may be sequentially performed in the plurality of drivers SRIC1 to SRIC4.

The microcontroller MCU is configured to transmit the read command to the plurality of drivers SRIC1 to SRIC4 through the MPI buses DM_MPI and CM_MPI in a first period for the read request, and receive the touch data of the selected driver through the MPI buses DM_MPI and CM_MPI in a second period for the read data operation.

Further, the plurality of drivers SRIC1 to SRIC4 are configured to share the MPI buses DM_MPI and CM_MPI and the signal line SIL with each other. The selected driver of the plurality of drivers SRIC1 to SRIC4 transmits the touch data by the read data operation through the MPI buses DM_MPI and CM_MPI in the second period.

The reception buffers 50 and 52 of the plurality of drivers SRIC1 to SRIC4 are turned on during the first period and turned off during the second period.

In addition, the selected driver generates the wake-up signal corresponding to the end of the transmission of the touch data and transmits the wake-up signal to the unselected drivers through the signal line SIL. As a result, the turn-on time points of the reception buffers 50 and 52 of the selected driver and the unselected drivers are synchronized with the wake-up signal.

Meanwhile, the plurality of drivers SRIC1 to SRIC4 may use the signal line SIL for transmitting the lock signal corresponding to a clock state of the display data during the display period and for transmitting the wake-up signal generated by the selected driver during the touch period.

In addition, each of the drivers includes the lock signal input terminal LI and the lock signal output terminal LO connected to the signal line SIL, receives the wake-up signal WU of the signal line SIL through the lock signal input terminal LI, and transmits the wake-up signal WU to the signal line SIL through the lock signal output terminal LO.

Figure 2:
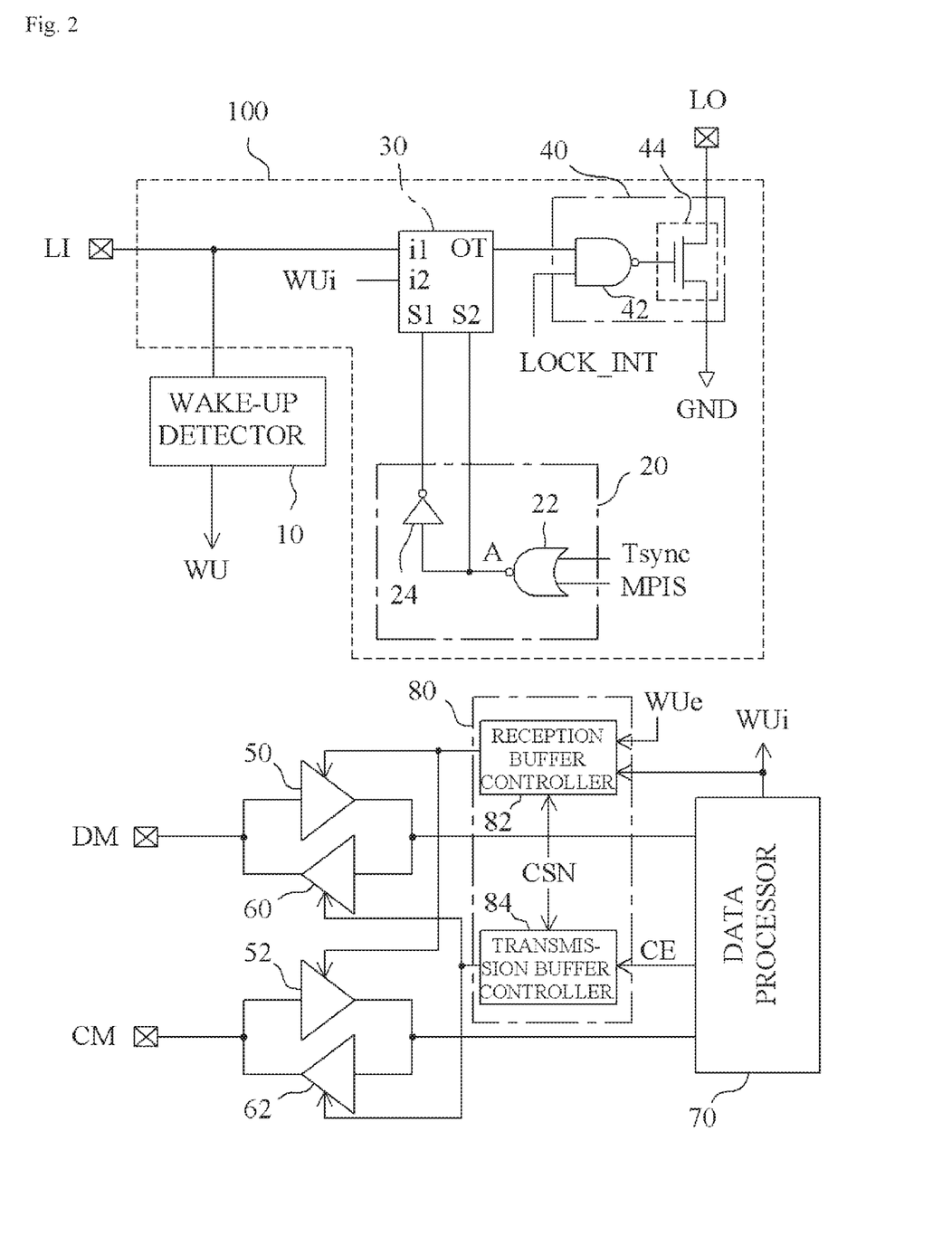
FIG. 2 is a circuit diagram of a driver for describing buffer control and transmission of a wake-up signal.

For the operation of the above-described embodiment, each of the drivers SRIC1 to SRIC4 may be configured as shown in FIG. 2. For the convenience of description, it is assumed that FIG. 2 exemplifies the driver SRIC1.

The driver SRIC1 includes the reception buffers 50 and 52, the transmission buffers 60 and 62, a data processor 70, a wake-up detector 10, a transmission circuit 100, and a buffer controller 80.

The drivers SRICs shown in FIG. 1 illustrate only the components necessary for the operation of the embodiment of the present disclosure, and parts for converting the display data into the source signal, parts for reading out the touch signals, and parts for changing the touch signals into the touch data and transmitting the touch data are omitted.

The reception buffer 50 and the transmission buffer 60 share the same MPI bus DM_MPI connected to the data terminal DM. In addition, the reception buffer 52 and the transmission buffer 62 share the same MPI bus CM_MPI connected to the clock terminal CM.

That is, the reception buffers 50 and 52 are connected to the MPI buses DM_MPI and CM_MPI outside the driver SRIC1, and configured to be turned on in the first period for the read request during the read operation and turned off in the second period for the read data operation following the read command.

In addition, the transmission buffers 60 and 62 are connected to the MPI buses DM_MPI and CM_MPI outside the driver SRIC1, and configured to be turned off in the first period and turned on in the second period to transmit the touch data when it is the selected driver.

The data processor 70 is configured such that a first input/output line is commonly connected to the reception buffer 50 and the transmission buffer 60, which are connected to the data terminal DM, and a second input/output line is commonly connected to the reception buffer 52 and the transmission buffer 62, which are connected to the clock terminal CM.

The data processor 70 receives the read command through the reception buffers 50 and 52, provides the touch data to the transmission buffers 60 and 62 in the second period when it is the selected driver, and generates a wake-up signal WUi corresponding to the end of the transmission of the touch data. The wake-up signal of the data processor 70 is expressed as "WUi" to distinguish it from the wake-up signal WU shared on the signal line SIL.

The wake-up detector 10 is connected to the lock signal input terminal LI connected to the signal line SIL, and configured to detect the wake-up signal WU shared through the signal line SIL used for the transmission of the lock signal. More specifically, the wake-up detector 10 detects the wake-up signal WU transmitted on the lock signal in which a high or low state is maintained.

The transmission circuit 100 is configured to receive the wake-up signal WU of the signal line SIL or the wake-up signal WUi of the data processor 70, transmit the wake-up signal WUi of the data processor 70 to the signal line SIL when it is the selected driver, and transmit the wake-up signal WU of the signal line SIL to the signal line SIL when it is the unselected driver.

Further, the buffer controller 80 controls the turn-on and turn-off of the reception buffers 50 and 52 and the transmission buffers 60 and 62 in response to the operation control signal CSN which has different voltage levels in the first period and the second period and is received through the external control line CSL. In addition, the buffer controller 80 controls the turn-on time points of the reception buffers 50 and 52 to synchronize with the wake-up signal WU of the signal line SIL or the wake-up signal WUi of the data processor 70.

Further, the transmission circuit 100 is configured to include a selection controller 20, a wake-up signal selector 30, and an output unit 40.

The selection controller 20 is configured to output a selection control signal that determines a first case in which it is the unselected driver in the touch period and a second case in which it is the selected driver in the touch period.

More specifically, the selection controller 20 is configured to control the operation of the wake-up signal selector 30 by a combination of the touch period control signal Tsync and an MPI selection signal MPIS.

To this end, the selection controller 20 includes a NOR gate 22 and an inverter 24. The inverter 24 inverts an output of the NOR gate 22 and outputs the inverted output of the NOR gate 22 to a first selection terminal S1 of the wake-up signal selector 30. In addition, the NOR gate 22 receives the touch period control signal Tsync and the MPI selection signal MPIS, and outputs the result obtained by performing a NOR operation on the touch period control signal Tsync and the MPI selection signal MPIS to a second selection terminal S2 of the wake-up signal selector 30.

The touch period control signal Tsync is provided at a logical low level Tsync="L") corresponding to the touch period, and provided at a logical high level (Tsync="H") corresponding to the display period. Also, the MPI selection signal MPIS is provided at a logical low level (MPIS="L") when it is the selected driver, and provided at a logical high level (MPIS="H") when it is the unselected driver.

Thus, in the first case in which it is the unselected driver in the touch period, the touch period control signal Tsync is at the logical low level, and the MPI selection signal MPIS is at the logical high level. In addition, in the second case in which it is the selected driver in the touch period, both the touch period control signal Tsync and the MPI selection signal MPIS are at the logical low level.

The NOR gate 22 outputs a high level in the second case in which it is the selected driver in the touch period as shown in Table 1. As a result, as a logical low level signal is applied to the first selection terminal S1, and a logical high level signal is applied to the second selection terminal S2, the wake-up signal selector 30 selects a signal of a second input terminal i2 and outputs the selected signal to an output terminal OT.

The NOR gate 22 outputs a low level in the first case in which it is unselected driver in the touch period, and in the display period as shown in Table 1. As a result, as the logical high level signal is applied to the first selection terminal S1, and the logical low level signal is applied to the second selection terminal S2, the wake-up signal selector 30 selects a signal of a first input terminal i1 and outputs the selected signal to the output terminal OT.

The signals applied to the first selection terminal S1 and the second selection terminal S2 of the wake-up signal selector 30 may be defined as the "selection control signal".

The wake-up signal selector 30 selects the signal of the first input terminal i1 or the second input terminal i2 by the selection control signal applied to the first selection terminal S and the second selection terminal S2 and outputs the selected signal to the output terminal OT.

According to the above description, the wake-up signal selector 30 selects and outputs the signal of the first input terminal i1 received through the lock signal input terminal LI in the first case, and selects and outputs the wake-up signal WUi of the data processor 70 applied to the second input terminal i2 in the second case.

In the first case, the wake-up signal WU of the signal line SIL is input to the first input terminal i1 of the wake-up signal selector 30 through the lock signal input terminal LI. Thus, it may be understood that the wake-up signal selector 30 selects and outputs the wake-up signal WU of the signal line SIL in the first case.

Further, in the case of the display period, the wake-up signal selector 30 is fixed to select and output the signal received through the lock signal input terminal LI by the selection control signal.

TABLE 1

| Tsync | MPIS | A | Remarks |
|---|---|---|---|
| L | L | H | Touch period. Selected SRIC. Output WU of i2. |
| L | H | L | Touch period. Unselected SRIC. Output WU of i1. |
| H | L | L | Display period. Output signal of i1. |
| H | H | L | |

In Table 1, "A" refers to the output of the NOR gate 22.

Meanwhile, the output unit 40 includes a NAND gate 42 and a switching element 44. Among these, the NAND gate 42 outputs the result obtained by performing a NAND operation on the output of the wake-up signal selector 30 and the internal lock signal LOCK_INT to the switching element 44. Also, the switching element 44 is configured to switch a connection between the lock signal output terminal LO and a ground terminal GND by an output of the NAND gate 42.

The switching element 44 may be exemplified as being composed of an NMOS transistor, and in this case, the switching operation is controlled by the output of the NAND gate 42 applied to a gate of the NMOS transistor. When the switching element 44 is turned on, a voltage of the signal line SIL connected to the lock signal output terminal LO drops from the pull-up voltage to a pull-down voltage of a ground level. Also, when the switching element 44 is turned off, the voltage of the signal line SIL connected to the lock signal output terminal LO is maintained at the pull-up voltage.

With the above-described configuration, in the display period, the output unit 40 outputs the result obtained by combining the lock signal LOCK of the signal line SIL, which is transmitted through the wake-up signal selector 30 and the lock signal input terminal LI, and the internal lock signal LOCK_INT to the signal line SIL through the lock signal output terminal LO.

In the display period, the lock signal LOCK of the other drivers is applied to the lock signal input terminal LI. As an example, the lock signal input terminal LI receives the lock signal LOCK of a high level when the other drivers are in the normal lock state, and receives the lock signal LOCK of a low level when the other drivers have the lock failure.

The lock signal LOCK of the lock signal input terminal LI in the display period is input to the NAND gate 42 through the wake-up signal selector 30. That is, the NAND gate 42 controls the switching of the switching element 44 with the lock signal LOCK of the lock signal input terminal LI and the internal lock signal LOCK_INT.

The NAND gate 42 outputs a low level when the lock signal LOCK of the lock signal input terminal LI and the internal lock signal LOCK_INT are normal, and outputs a high level in the other cases.

As a result, the signal output unit 40 maintains the signal line SIL at the high level when the lock states of the other drivers and the driver SRIC1 are normal, and pulls down the signal line SIL to the low level when the lock state of any one of the drivers is abnormal.

Further, in the touch period, the output unit 40 outputs the wake-up signal output from the wake-up signal selector 30 to the signal line SIL through the lock signal output terminal LO.

As a result, the signal line SIL transmits the lock signal or the wake-up signal by being pulled up or pulled down according to the switching state of the switching element 44, and the output unit 40 outputs the lock signal LOCK to the signal line SIL in the display period and outputs the wake-up signal WU to the signal line SIL in the touch period.

Meanwhile, the above-described buffer controller 80 is configured to control the reception buffers 50 and 52 and the transmission buffers 60 and 62 using the operation control signal CSN transmitted from the microcontroller MCU through the control line CSL, using the wake-up signal WU of the signal line SIL or the wake-up signal WUi of the data processor 70, and using a selection control signal CE of the data processor 70.

The buffer controller 80 includes a reception buffer controller 82 and a transmission buffer controller 84.

The reception buffer controller 82 provides a receiving control signal to the reception buffers 50 and 52. More specifically, the reception buffer controller 82 turns on the reception buffers 50 and 52 in the first period and turns off the reception buffers 50 and 52 in the second period in response to the operation control signal CSN. In addition, the reception buffer controller 82 controls the reception buffers 50 and 52 such that the turn-on time point is synchronized with the wake-up signal WU of the data processor 70 or the wake-up detector 10.

Further, the transmission buffer controller 84 provides a transmission control signal to the transmission buffers 60 and 62. More specifically, when it is the selected driver, the transmission buffer controller 84 turns on the transmission buffers 60 and 62 in response to the operation control signal CSN in the second period when the selection control signal CE is provided from the data processor 70.

With the above-described configuration of the buffer controller 80, the reception buffers 50 and 52 of the plurality of drivers SRIC1 to SRIC4 are turned on in the first period and turned off in the second period in response to the operation control signal CSN.

Further, the turn-on time points of the reception buffers 50 and 52 of the selected driver are synchronized with the wake-up signal WUi of the data processor 70, and the reception buffers 50 and 52 of the unselected driver are synchronized with the wake-up signal WU of the wake-up detector 10.

Further, the transmission buffers 60 and 62 of the selected driver are turned on in response to the operation control signal CSN in the second period.

With the above-described configurations of FIGS. 1 and 2, the embodiment of the present disclosure may perform the read operation of the microcontroller MCU. This will be further described with reference to FIGS. 3 to 8.

Figure 3:
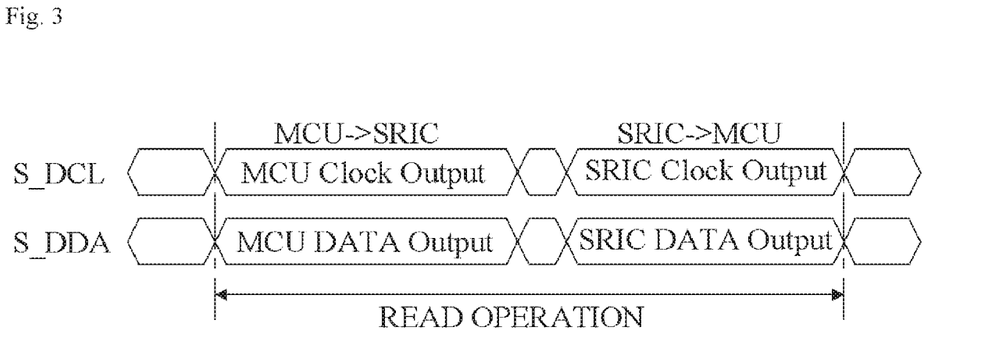
FIG. 3 is a timing diagram for describing a read operation of touch data.
Figure 4:
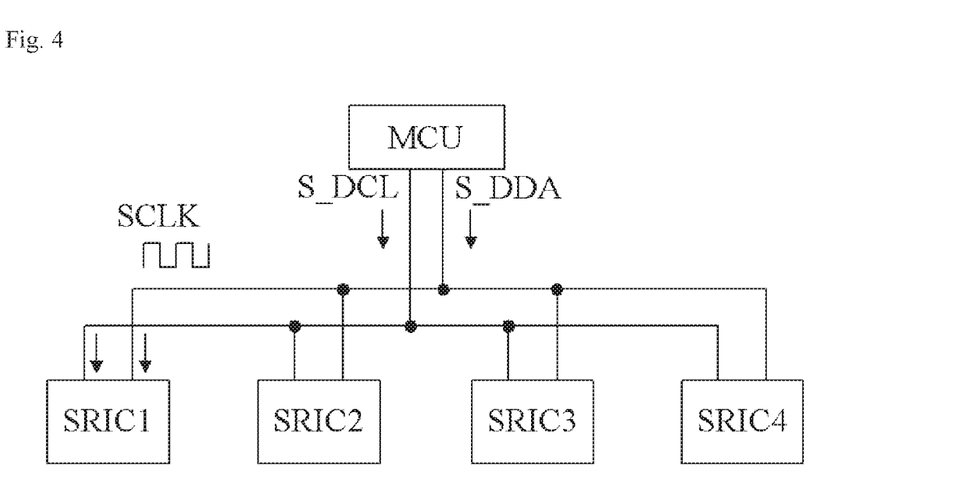
FIG. 4 is a block diagram for describing a read request during a read operation.

For the read operation, as shown in FIGS. 3 and 4, the microcontroller MCU performs the read request for outputting the read command to the drivers SRIC1 to SRIC4 using a system clock SCLK. Here, the system clock SCLK may be understood as a clock of the microcontroller MCU.

Figure 5:
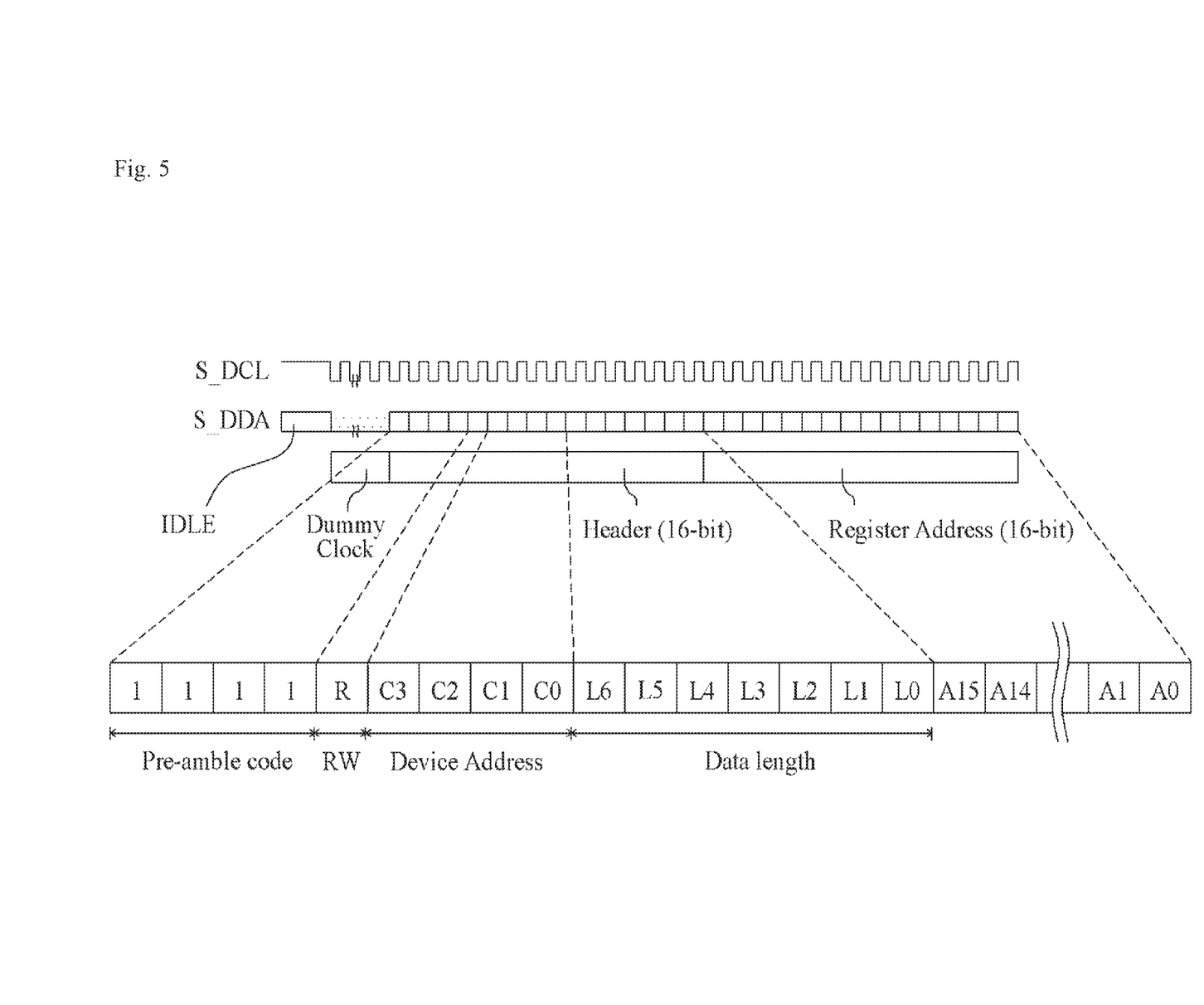
FIG. 5 is a diagram exemplifying protocols of a DCL signal and a DDA signal for the read request of FIG. 4.

Protocols of the DCL signal S_DCL of the MPI bus CM_MPI and the DDA signal S_DDA of the MPI bus DM_MPI by the read request of the microcontroller MCU are as shown in FIG. 5.

The microcontroller MCU provides the DDA signal S_DDA to include an address of a device to be selected at the time of the read request, and the selected driver is determined by the device address (C3:C0). The plurality of drivers SRIC1 to SRIC4 determine whether the read request has selected itself through the device address (C3:C0).

For reference, the DDA signal S_DDA of the microcontroller MCU may be formed in a format including a dummy clock period, a header (16 bits), and a register address (16 bits).

The DDA signal S_DDA may be set to have a value that performs a specific function in the dummy clock period according to the intention of a manufacturer.

The header of the DDA signal may be used for a preamble code defining a transmission type, a discrimination bit RW for discriminating the write and the read, and defining the device address and data length.

The preamble code may have a code value for defining the read request and may be composed of various bits by the manufacturer. The embodiment of the present disclosure exemplifies that the preamble code is composed of 4 bits.

For example, a preamble code "1, 1, 1, 1" indicates that the microcontroller MCU transmits the write or read command to the specific driver, a preamble code "1, 1, 1, 0" indicates that the microcontroller MCU transmits the write command to all the drivers, a preamble code "1, 1, 0, 1" indicates that the specific driver transmits the touch data to the microcontroller MCU, and a preamble code "1, 1, 0, 0" indicates that the specific driver transmits a data ready command to the microcontroller MCU. As described above, the preamble code defines the transmission type according to the code value of the bits.

Since the read request of the embodiment of the present disclosure is that the microcontroller MCU transmits the read command to the specific driver, it may be understood that the preamble code is set to "1, 1, 1, 1".

The discrimination bit for discriminating between the write and the read may be set to mean the "read" in the case of having a bit value corresponding to "R", and the "write" in the case of having a bit value corresponding to "W". For the read request of the embodiment of the present disclosure, it may be understood that the discrimination bit for discriminating between the write and the read has a bit value corresponding to "R" for the read.

The device address may be designated as the address of the driver for performing the read request.

Also, the data length is exemplified as being 7 bits, and 7 bits indicates that up to 127 data can be written and read.

Further, the register address (16 bits) of the DDA signal S_DDA is for designating the address of the register for writing data.

In the embodiment of the present disclosure, the read request is performed prior to the read data operation, only the designated selected driver occupies the MPI buses and transmits the touch data by the read data operation, and the reception buffers of the selected driver and all the unselected drivers are turned off. Thus, the MPI buses may be prevented from being abnormally occupied by turning on the reception buffers of the unselected drivers.

Figure 6:
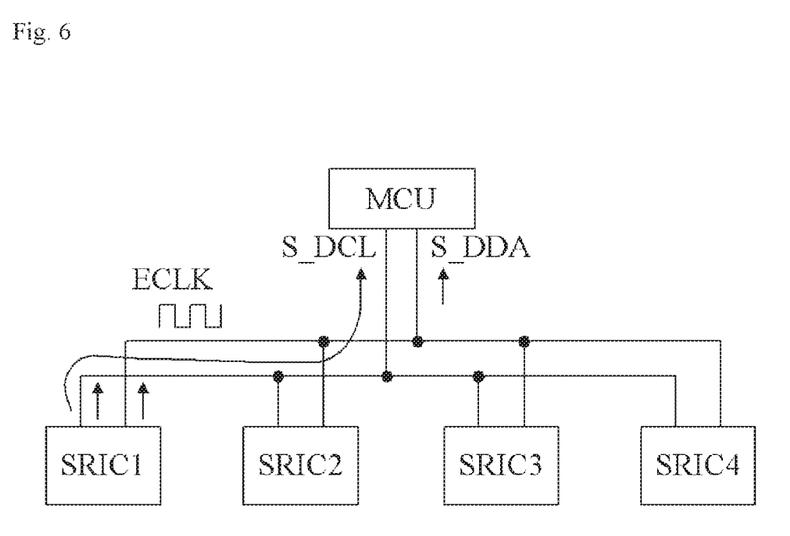
FIG. 6 is a block diagram for describing a read data operation during the read operation.

For the read data operation, as shown in FIGS. 3 and 6, the selected driver transmits the touch data to the microcontroller MCU using the transmission clock ECLK. Here, the transmission clock ECLK may be understood as a clock of the selected driver SRIC1.

Figure 7:
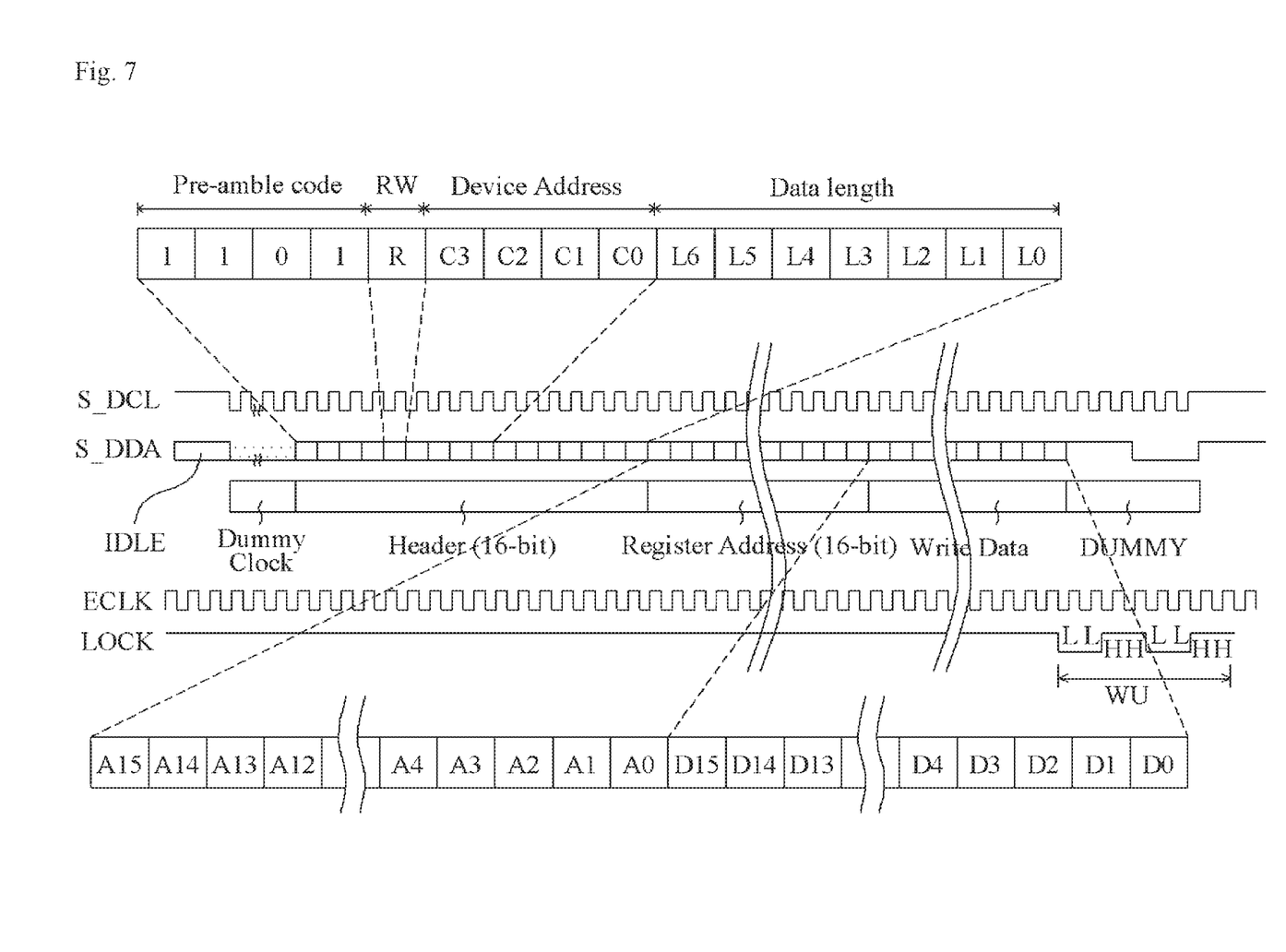
FIG. 7 is a diagram exemplifying protocols of the DCL signal and the DDA signal for the read data operation of FIG. 6 and a wake-up signal.

For the read data operation, the protocols of the DCL signal S_DCL and the DDA signal S_DDA transmitted from the selected driver to the microcontroller MCU are as shown in FIG. 7.

More specifically, the DDA signal S_DDA transmitted by the selected driver to the microcontroller MCU may be formed in a format including a dummy clock period, a header (16 bits), a register address (16 bits), write data, and a dummy.

The dummy clock period, the header (16 bits), and the register address (16 bits) of the DDA signal S_DDA transmitted by the selected driver may be understood with reference to the DDA signal S_DDA of FIG. 5 transmitted by the microcontroller MCU.

Among them, a preamble code of the header is defined as "1, 1, 0, 1" indicating that the specific driver transmits the touch data to the microcontroller MCU, a discrimination bit for discriminating between the write and the read is set to have a bit value corresponding to "R" for the read, a device address is designated by the address of the selected driver, and the register address may be set to a register address from which the data is read.

In addition, the write data includes the touch data read from the driver selected for the read data operation.

The dummy may be defined as indicating the period during which the wake-up signal WU is positioned on the lock signal LOCK according to the embodiment of the present disclosure. In FIG. 7, the lock signal LOCK corresponding to the dummy is exemplified as being set to "LLHHLLHH". However, the wake-up signal WU may be variously defined according to the intention of the manufacturer.

With the above description, the embodiment of the present disclosure will be described with reference to FIG. 8, in which the plurality of drivers SRIC1 to SRIC4 perform the read operation in response to the read request of the microcontroller MCU.

Figure 8:
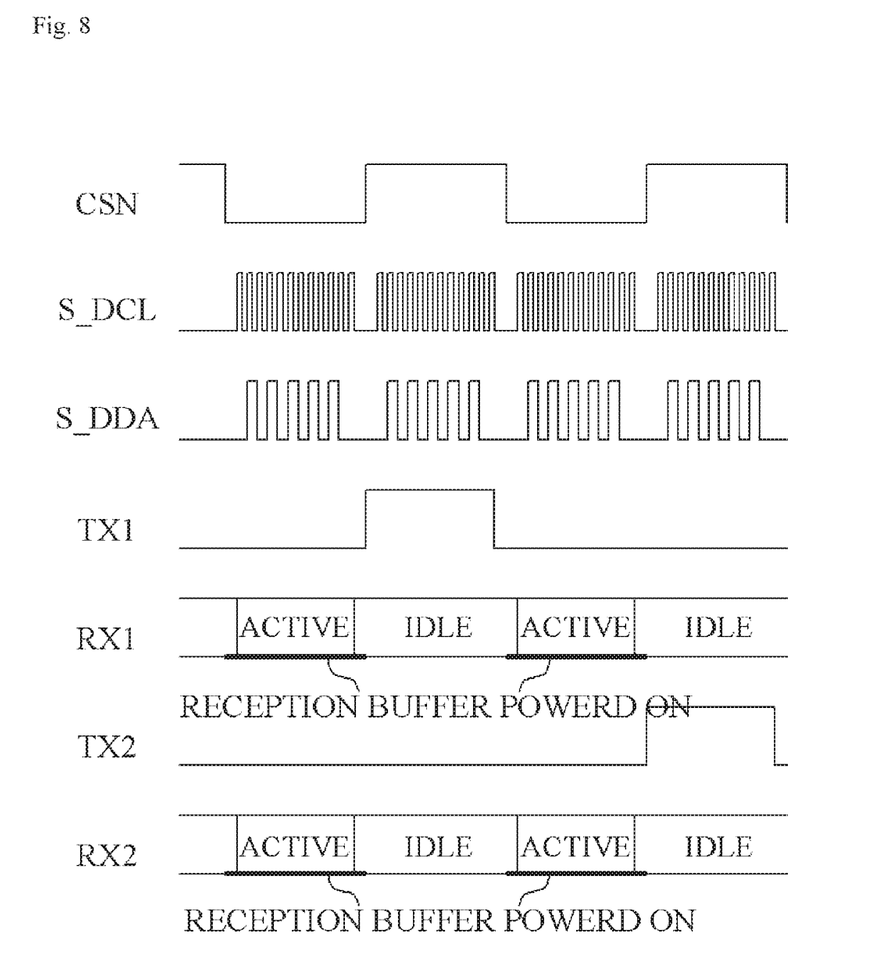
FIG. 8 is a waveform diagram for describing operations of a reception buffer and a transmission buffer between a plurality of drivers.

In FIG. 8, "CSN" may be understood as a waveform for indicating the operation control signal. A first period in which the operation control signal CSN is at a low level is a period in which the microcontroller MCU transmits the read command for the read request, and may be understood as a period in which the read command for selecting the specific driver is transmitted through the MPI buses DM_MPI and CM_MPI as the DDA signal S_DDA and the DCL signal S_DCL. A second period in which the operation control signal CSN is at a high level may be understood as a period in which the selected driver performs the read data operation for transmitting the touch data.

The DDA signal S_DDA and the DCL signal S_DCL of FIG. 8 may be understood as the read command transmitted from the microcontroller MCU to the drivers through the MPI bus in the first period, and the touch data transmitted from the selected driver to the microcontroller MCU in the second period. The driver SRIC1 and the driver SRIC2 are exemplified in FIG. 8 for convenience of description, and RX1 indicates the operation of the reception buffers 50 and 52 of the driver SRIC1, TX1 indicates the operation of the transmission buffers 60 and 62 of the driver SRIC1, RX2 indicates the operation of the reception buffers 50 and 52 of the driver SRIC2, and TX2 indicates the operation of the transmission buffers 60 and 62 of the driver SRIC2.

First, in a first low period of the operation control signal CSN, the DDA signal S_DDA and the DCL signal S_DCL are transmitted from the microcontroller MCU to the drivers SRIC1 and SRIC2 through the MPI buses DM_MPI and CM_MPI as the read command. Here, it may be assumed that the driver SRIC1 is selected by the read request through the read command of the microcontroller MCU. Further, the reception buffers 50 and 52 of the drivers SRIC1 and SRIC2 are turned on in response to the operation control signal CSN in the first period. Here, the transmission buffers 60 and 62 of the drivers SRIC1 and SRIC2 remain turned off.

The drivers SRIC1 and SRIC2 maintain an active state for receiving the read command in the state in which the reception buffers 50 and 52 are turned on in response to the operation control signal CSN, The driver SRIC1 recognizes that the read command in the first period selects itself, and recognizing the selection with the read command may be performed by the data processor 70.

When the transmission of the read command of the microcontroller MCU is ended and the operation control signal CSN is changed to the high level, the reception buffers 50 and 52 of the drivers SRIC1 and SRIC2 are turned off and changed into an idle state. That is, the reception buffers 50 and 52 of the drivers SRIC1 and SRIC2 are powered off and do not share the MPI buses DM_MPI and CM_MPI.

The driver SRIC1 is designated as the selected driver by the read command in the first period corresponding to the first low period of the operation control signal CSN.

Thereafter, when the read operation enters the second period corresponding to a first high period of the operation control signal CSN, the transmission buffers 60 and 62 of the driver SRIC1 are turned on and occupy the MPI buses DM_MPI and CM_MPI.

The transmission buffers 60 and 62 of the driver SRIC1 transmit the DDA signal S_DDA and the DCL signal S_DCL to the microcontroller MCU through the MPI buses DM_MPI and CM_MPI as the touch data. Here, the reception buffers 50 and 52 of the drivers SRIC1 and SRIC2 remain turned off during the second period, and the transmission buffers 60 and 62 of the driver SRIC2 that is the unselected driver also remain turned off during the second period.

The transmission buffers 60 and 62 of the driver SRIC1 are controlled to be turned on by the transmission buffer controller 84, and the transmission buffer controller 84 turns on the transmission buffers 60 and 62 in response to the operation control signal CSN in the second period when the selection control signal CE is provided from the data processor 70 in response to the read command.

When the transmission buffers 60 and 62 of the driver SRIC1 transmit the touch data through the MPI buses DM_MPI and CM_MPI in the first high period of the operation control signal CSN, only the microcontroller MCU turns on a buffer for receiving, and the driver SRIC2 turns off the reception buffers 50 and 52. Thus, it is possible to prevent a situation in which an eye diagram of the driver SRIC2 is deteriorated due to the influence of the touch data transmitted through the MPI buses DM_MPI and CM_MPI, and thus the driver SRIC2 is brought into an abnormal status. Also, current consumption may be reduced as the reception buffers 50 and 52 of the drivers SRIC1 and SRIC2 are turned off.

Further, when the driver SRIC1 completes the transmission of the touch data in the first high period of the operation control signal CSN, the data processor 70 of the driver SRIC1 generates the wake-up signal WUi. The wake-up signal WUi generated in the driver SRIC1 is shared on the signal line SIL as the wake-up signal WU through the transmission circuit 100. The driver SRIC2 may receive the wake-up signal WU shared on the signal line SIL.

When the first high period of the operation control signal CSN is ended, the transmission buffers 60 and 62 of the driver SRIC1 are turned off at the time point when the operation control signal CSN is changed to low.

Thereafter, in a second low period of the operation control signal CSN, the reception buffers 50 and 52 of the drivers SRIC1 and SRIC2 are turned on in response to the operation control signal CSN. The turn-on time points of the reception buffers 50 and 52 of the driver SRIC1 are synchronized with the wake-up signal WUi of the data processor 70, and the turn-on time points of the reception buffers 50 and 52 of the driver SRIC2 are synchronized with the wake-up signal WU of the signal line SIL. That is, since the turn-on time points of the reception buffers 50 and 52 of the drivers SRIC1 and SRIC2 may be synchronized at the same time point, communication errors may be prevented.

In the second low period of the operation control signal CSN, the DDA signal S_DDA and the DCL signal S_DCL are transmitted from the microcontroller MCU to the drivers SRIC1 and SRIC2 through the MPI buses DM_MPI and CM_MPI as the read command. Here, the driver SRIC2 may be selected by the read request through the read command of the microcontroller MCU. Further, the reception buffers 50 and 52 of the drivers SRIC1 and SRIC2 are turned on in response to the operation control signal CSN in the first period. Here, the transmission buffers 60 and 62 of the drivers SRIC1 and SRIC2 remain turned off.

The drivers SRIC1 and SRIC2 maintain the active state for receiving the read command in the state in which the reception buffers 50 and 52 are turned on in response to the operation control signal CSN, The driver SRIC2 recognizes that the read command selects itself, and recognizing the selection with the read command may be performed by the data processor 70.

When the transmission of the read command of the microcontroller MCU is ended and the operation control signal CSN is changed to the high level, the reception buffers 50 and 52 of the drivers SRIC1 and SRIC2 are turned off and changed into an idle state. That is, the reception buffers 50 and 52 of the drivers SRIC1 and SRIC2 are powered off and do not share the MPI buses DM_MPI and CM_MPI.

The driver SRIC2 is designated as the selected driver by the read command in the first period corresponding to the second low period of the operation control signal CSN.

Thereafter, when the read operation enters the second period corresponding to a second high period of the operation control signal CSN, the transmission buffers 60 and 62 of the driver SRIC2 are turned on and occupy the MPI buses DM_MPI and CM_MPI.

The transmission buffers 60 and 62 of the driver SRIC2 transmit the DDA signal S_DDA and the DCL signal S_DCL to the microcontroller MCU through the MPI buses DM_MPI and CM_MPI as the touch data. Here, the reception buffers 50 and 52 of the drivers SRIC1 and SRIC2 remain turned off during the second period, and the transmission buffers 60 and 62 of the driver SRIC1 that is the unselected driver also remain turned off during the second period.

The transmission buffers 60 and 62 of the driver SRIC2 are controlled to be turned on by the transmission buffer controller 84, and the transmission buffer controller 84 turns on the transmission buffers 60 and 62 in response to the operation control signal CSN in the second period when the selection control signal CE is provided from the data processor 70 in response to the read command.

When the transmission buffers 60 and 62 of the driver SRIC2 transmit the touch data through the MPI buses DM_MPI and CM_MPI in the second high period of the operation control signal CSN, only the microcontroller MCU turns on the buffer for receiving. The driver SRIC1 turns off the reception buffers 50 and 52. Thus, it is possible to prevent a situation in which an eye diagram of the driver SRIC1 is deteriorated due to the influence of the touch data transmitted through the MPI buses DM_MPI and CM_MPI, and thus the driver SRIC1 is brought into an abnormal status. Also, the current consumption may be reduced as the reception buffers 50 and 52 of the drivers SRIC1 and SRIC2 are turned off.

Further, when the driver SRIC2 completes the transmission of the touch data in the second high period of the operation control signal CSN, the data processor 70 of the driver SRIC2 generates the wake-up signal WUi. The wake-up signal WUi generated in the driver SRIC2 is shared on the signal line SIL through the transmission circuit 100 as the wake-up signal WU. The driver SRIC1 may receive the wake-up signal WU shared on the signal line SIL.

When the second high period of the operation control signal CSN is ended, the transmission buffers 60 and 62 of the driver SRIC2 are turned off at the time point when the operation control signal CSN is changed to low.

As described above, in the present disclosure, control is performed such that the reception buffers of the plurality of drivers are turned on in response to the read request and turned off in response to the read data operation when the microcontroller and the plurality of drivers share the MPI bus and perform the read operation for the touch.

That is, the reception buffers of the plurality of drivers are periodically turned off without having to monitor the MPI bus constantly. Thus, the current consumption may be reduced as the reception buffers are periodically turned off.

Further, in the present disclosure, the reception buffers of the unselected drivers are turned off in the read data operation. Thus, it is possible to prevent the situation in which the eye diagram of the unselected driver is deteriorated due to the influence of the touch data transmitted through the shared MPI buses and thus the unselected driver is brought into abnormal status.

Further, in the present disclosure, the plurality of drivers may recognize the start and the end of the command for the read request at the same time point using the wake-up signal shared through the signal line and the operation control signal. Accordingly, the time point at which the reception buffers of the plurality of drivers are controlled may be improved, and the communication failure between the drivers may be prevented.

Particularly, in the present disclosure, the unselected driver may be notified of the time point at which the selected driver completes the transmission of the touch data using the signal line transmitting the lock signal. Thus, the time point at which the reception buffers of the plurality of drivers are controlled may be improved, and the communication failure between the drivers may be prevented. Also, the display device may transmit the wake-up signal using the signal line transmitting the lock signal without the burden of hardware such as additional wiring. Thus, it is possible to efficiently configure the display device that may share a time point at which the transmission between drivers is completed.

In the present disclosure, control can be performed such that reception buffers of a plurality of drivers are turned on in response to a read request and turned off in response to a read data operation when a microcontroller and the plurality of drivers share an MPI bus and perform a read operation for a touch. By controlling the reception buffers as described above, current consumption due to turning on the reception buffers for monitoring can be reduced.

Further, an unselected driver can be prevented from being brought into an abnormal status due to a deteriorated eye diagram caused by an influence of touch data transmitted through a shared MPI bus by turning off reception buffers of the unselected driver in a read data operation.

Further, in the present disclosure, the plurality of drivers can recognize a start and an end of a command for a read request at the same time point using a wake-up signal shared through a signal line and an operation control signal. Accordingly, a time point at which the reception buffers of the plurality of drivers are controlled can be improved, and a communication failure between the drivers can be prevented.

Further, in the present disclosure, a time point at which the reception buffers of the plurality of drivers are controlled can be improved and a communication failure between the plurality of drivers can be prevented by notifying the unselected drivers of a time point, at which a selected driver completes transmission of touch data, using a signal line for transmitting a lock signal.

Further, the display device can transmit the wake-up signal, using the signal line for transmitting the lock signal, without the burden of hardware such as additional wiring. Thus, there is an effect that the display device capable of sharing a time point at which transmission between the drivers is completed can be efficiently configured.

It will be apparent to those skilled in the art that various modifications can be made to the above-described exemplary embodiments of the present disclosure without departing from the spirit or scope of the disclosure. Thus, it is intended that the present disclosure covers all such modifications provided they come within the scope of the appended claims and their equivalents.

What is claimed is:

1. A display device comprising:
a controller configured to transmit a read command for a read request through a bus in a first period and receive touch data through the bus in a second period; and
a first driver and a second driver configured to be connected to the bus,
wherein the first driver, as selected by the read command, transmits the touch data through the bus by the read command in the second period,
the first driver generates a wake-up signal corresponding to an end of the transmission of the touch data, and transmits the wake-up signal to the second driver,
reception buffers of the first driver and the second driver are turned on during the first period and turned off during the second period, and
turn-on time points of the reception buffers are synchronized with the wake-up signal.

2. The display device of claim 1, wherein the read data operation is sequentially performed in the first driver and the second driver by changing selection by the read command for every read operation cycle including the read request and the read data operation.

3. The display device of claim 1, wherein the first driver and the second driver is connected to a signal line, use the signal line for transmitting a lock signal corresponding to a clock state of display data in a display period and for transmitting the wake-up signal in a touch period.

4. The display device of claim 3, wherein each of the first driver and the second driver includes a lock signal input terminal and a lock signal output terminal connected to the signal line,
the first driver transmits the wake-up signal to the signal line through the lock signal output terminal,
the second driver receives the wake-up signal of the signal line through the lock signal input terminal.

5. The display device of claim 4, wherein a pull-up voltage of a predetermined level is applied to the signal line.

6. The display device of claim 1, wherein the first driver includes:
a data processor configured to generate the wake-up signal corresponding to the end of the transmission of the touch data;
a selection controller configured to output a selection control signal that determines a first case in which the driver is not selected by the read command and a second case in which the driver is selected by the read command, in a touch period;
a wake-up signal selector configured to select and output the wake-up signal received through an external signal line in the first case and to select and output the wake-up signal of the data processor in the second case by the selection control signal; and
an output unit configured to transmit the wake-up signal output from the wake-up signal selector to the external signal line.

7. The display device of claim 6, wherein the output unit further receives a lock signal corresponding to a clock state of display data in a display period, and transmits the lock signal and the wake-up signal to the external signal line.

8. The display device of claim 7, wherein the output unit includes a switching element connected to the external signal line, the switching element is switched by the lock signal or the wake-up signal, and the signal line applied a pull-up voltage transmits the lock signal or the wake-up signal by being pulled up or pulled down according to a switching state of the switching element.

9. The display device of claim 1, wherein the first driver includes:
    the reception buffer being turned on in the first period and turned off in the second period, and configured to receive the read command in the first period;
    a transmission buffer being turned off in the first period, and turned on in the second period to transmit the touch data;
    a data processor configured to receive the read command of the reception buffer, provide the touch data to the transmission buffer in the second period corresponding to selection of the first driver by the read command, and generate the wake-up signal corresponding to the end of the transmission of the touch data; and
    a transmission circuit configured to receive the wake-up signal of the signal line or the data processor, transmit the wake-up signal of the data processor or the wake-up signal of the signal line to the signal line depending on whether the first driver is selected by the read command.

10. The display device of claim 9, wherein the controller further provides operation control signals having different voltage levels in the first period and the second period to the first driver and the second driver through a control line,
    the reception buffers of the first driver and the second driver are turned on in the first period and turned off in the second period in response to the operation control signals,
    turn-on time point of the reception buffer of the first driver are synchronized with the wake-up signal of the data processor, and
    turn-on time point of the reception buffer of the second driver are synchronized with the wake-up signal of the signal line, and
    the transmission buffer of the first driver is turned on in the second period in response to the operation control signal.

11. The display device of claim 10, wherein the first driver further includes:
    a reception buffer controller configured to provide a receiving control signal to the reception buffers; and
    a transmission buffer controller configured to provide a transmission control signal to the transmission buffers,
    wherein the reception buffer controller turns on the reception buffers in the first period and turns off the reception buffers in the second period in response to the operation control signal, and provides the receiving control signal so that the turn-on time points of the reception buffers are synchronized with the wake-up signal of the data processor or the signal line, and
    the transmission buffer controller provides the transmission control signal to turn on the transmission buffers in the second period in response to the operation control signal when the selection control signal is provided in the data processor.

12. The display device of claim 9, wherein the transmission circuit includes:
    a selection controller configured to output a selection control signal that determines a first case in which the driver is not selected by the read command and a second case in which the driver is selected by the read command, in a touch period;
    a wake-up signal selector configured to select and output the wake-up signal of the signal line in the first case and to select and output the wake-up signal of the data processor in the second case by the selection control signal; and
    an output unit configured to transmit the wake-up signal output from the wake-up signal selector to the signal line.

13. The display device of claim 12, wherein the output unit further receives a lock signal corresponding to a clock state of display data in a display period, and transmits the lock signal and the wake-up signal to the signal line.

14. The display device of claim 13, wherein the output unit includes a switching element connected to the signal line, the switching element is switched by the lock signal or the wake-up signal, and the signal line applied a pull-up voltage transmits the lock signal or the wake-up signal by being pulled up or pulled down according to a switching state of the switching element.

15. A driver of a display device, the driver comprising:
    a reception buffer coupled to an external bus, and configured to be turned on in a first period for a read request during a read operation and to be turned off in a second period for a read data operation following a read command;
    a transmission buffer coupled to the bus, and configured to be turned off in the first period, and to be turned on in the second period to transmit touch data when the driver is selected by the read command received;
    a data processor configured to receive the read command through the reception buffer, provide the touch data to the transmission buffer in the second period when the driver is designated by the read command, and generate a wake-up signal corresponding to the end of the transmission of the touch data;
    a transmission circuit configured to receive the wake-up signal of an external signal line or the data processor, transmit the wake-up signal of the signal line to the signal line in a first case in which the driver is not selected by the read command, and transmit the wake-up signal of the data processor to the signal line in a second case in which the driver is selected by the read command; and
    a buffer controller configured to control turning on and off of the reception buffer and the transmission buffer in response to operation control signals having different voltage levels in the first period and the second period and received through an external control line, and to control such that a turn-on time point of the reception buffer is synchronized with the wake-up signal of the signal line or the data processor.

16. The driver of claim 15, wherein the buffer controller further includes:
    a reception buffer controller configured to provide a receiving control signal to the reception buffer;
    a transmission buffer controller configured to provide a transmission control signal to the transmission buffer,
    wherein the reception buffer controller turns on the reception buffer in the first period and turns off the reception buffer in the second period in response to the operation control signal, and provides the receiving control signal so that the turn-on time point of the reception buffer is synchronized with the wake-up signal of the data processor or the signal line, and the transmission buffer controller provides the transmission control signal to turn on the transmission buffer in the second period in response to the operation control signal when a selection control signal is provided in the data processor in the second case.

17. The driver of claim 15, wherein the transmission circuit includes:
 a selection controller configured to output a selection control signal that determines the first case and the second case in a touch period;
 a wake-up signal selector configured to select and output the wake-up signal of the signal line in the first case, and to select and output the wake-up signal of the data processor in the second case, by the selection control signal; and
 an output unit configured to transmit the wake-up signal output from the wake-up signal selector to the signal line.

18. The driver of claim 17, wherein the output unit further receives a lock signal corresponding to a clock state of display data in a display period, and transmits the lock signal and the wake-up signal to the signal line.

19. The driver of claim 18, wherein the output unit includes a switching element, the switching element transmits the lock signal or the wake-up signal to the signal line by switching by the lock signal or the wake-up signal.

20. The driver of claim 15, further comprising a lock signal input terminal and a lock signal output terminal connected to the signal line, wherein a pull-up voltage of a predetermined level is applied to the signal line, a lock signal corresponding to a clock state of display data is received through the signal line in a display period, and the wake-up signal is received in a touch period.

* * * * *